UNITED STATES PATENT OFFICE.

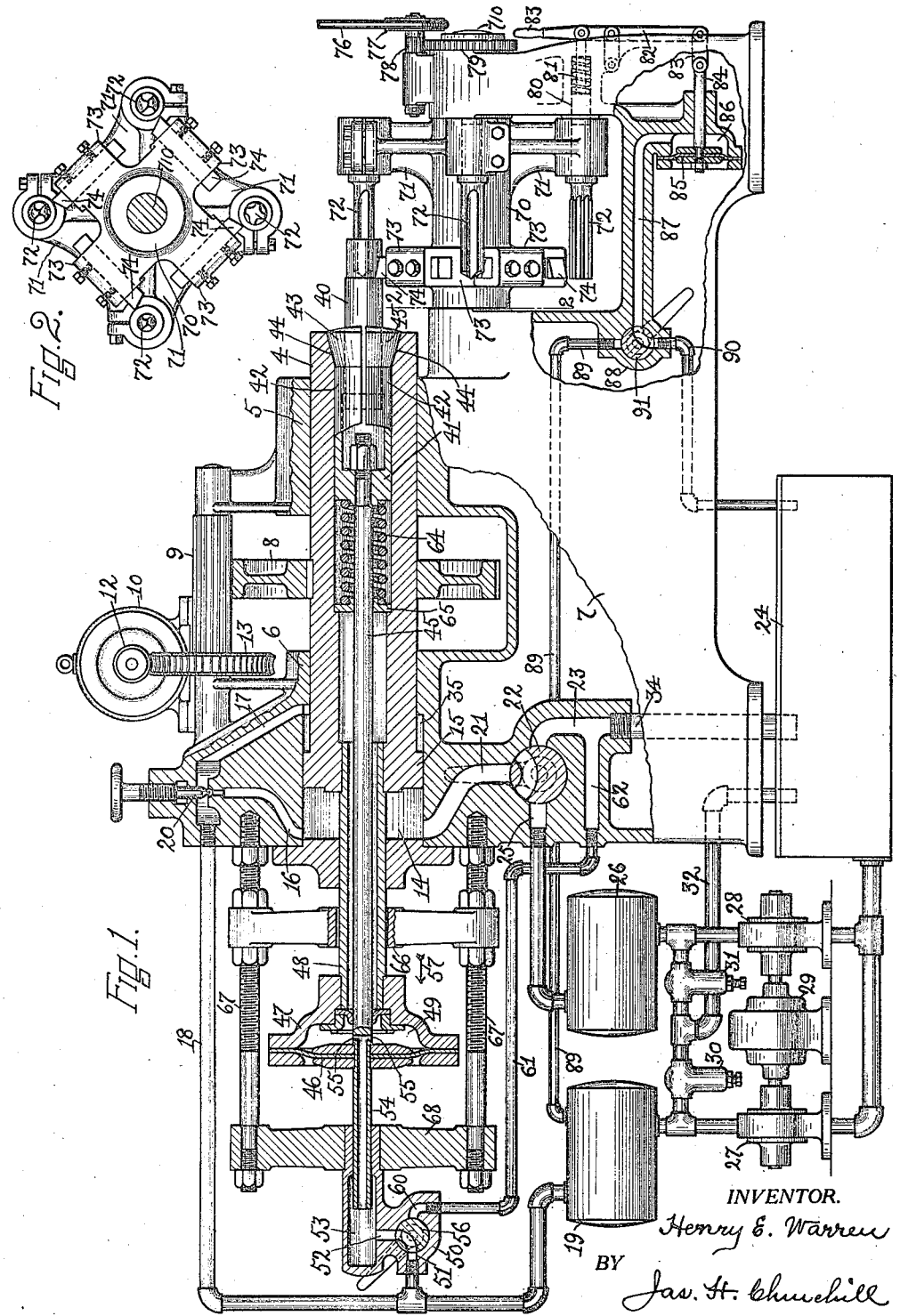

HENRY E. WARREN, OF ASHLAND, MASSACHUSETTS, ASSIGNOR TO THE LOMBARD GOVERNOR COMPANY, OF ASHLAND, MASSACHUSETS, A CORPORATION OF NEW JERSEY.

FLUID-OPERATED LATHE.

1,299,883.  Specification of Letters Patent.  Patented Apr. 8, 1919.

Application filed October 29, 1915. Serial No. 58,680.

*To all whom it may concern:*

Be it known that I, HENRY E. WARREN, a citizen of the United States, residing at Ashland, in the county of Middlesex and State of Massachusetts, have invented an Improvement in Fluid-Operated Lathes, of which the following description, in connection with the accompanying drawings, is a specification, like characters on the drawings representing like parts.

This invention relates to a machine which is especially designed and adapted among other uses to be employed for boring and turning metal pieces, and more particularly metal pieces for use in the manufacture of projectiles.

The invention has for its object to provide a superior machine for the purpose described, which is of maximum strength and can be operated with great power and at an increased speed, so that a large number of the projectiles or other devices can be made in a minimum time.

To this end, the machine is provided with a spindle having a piston attached to it to move as one piece, which are capable of being revolved and simultaneously moved axially at a substantially uniform rate, and said axial movement is preferably effected by fluid pressure, as will be described.

The spindle may be used as a holder for the work, and provision is made for securing the work to the spindle by fluid-actuated means, as will be described.

Provision is also made for moving the spindle axially by fluids under different pressure, for a purpose as will be described.

Provision is made for simultaneously performing different operations on the work as the spindle is moved axially.

These and other features of this invention will be pointed out in the claims at the end of this specification.

Figure 1 is a side elevation and partial section of a machine embodying this invention, and Fig. 2, a cross-section on the line 2—2, Fig. 1, looking toward the right.

In the present instance, the invention is shown as embodied in a machine in which the work is movable toward and from the tools. Referring to the drawing, 4 represents a heavy spindle, which is mounted in bearings 5, 6, carried by a framework 7. The spindle 4 is capable of being moved axially at a substantially uniform rate and of being revolved while it is being so moved.

The spindle 4 may be revolved as herein shown by a large gear 8, which meshes with a wide-faced pinion 9, which is driven by a motor 10 through a worm 12 and worm gear 13 or in any other suitable manner.

The spindle 4 may and preferably will be moved axially in one direction by fluid pressure, and for this purpose the bearing 6 is provided as herein shown with an annular enlargement 14, which forms a cylinder for a piston 15, which is attached to the spindle to revolve and to move axially therewith, and is herein shown as formed by the enlarged rear portion or head of the spindle. The cylinder 14 is provided at its opposite ends with fluid inlet ports or passages 16, 17, which are connected by a pipe 18 with a reservoir or tank 19 containing oil or other fluid under pressure.

The inlet port 17 may be left in open communication with the pressure reservoir 19, while the inlet port 16 may be controlled by a suitable valve, herein shown as a needle valve 20, which may be adjusted to regulate the flow of fluid into the cylinder 14 behind the piston 15 and the rate at which the spindle is fed forward.

The cylinder 14 is provided with a fluid outlet port or passage 21, which is controlled by a three-way valve 22, having a passage 23 leading to a sump-tank 24 and a passage 25 leading to a reservoir or tank 26 containing fluid under pressure, which may be materially lower than that of the fluid in the tank 19, for a purpose as will be described.

The pressure tanks 19, 26 are and may be supplied with fluid under pressure by pumps 27, 28, of known construction, which are operated as shown by an electric motor 29, and provision is made for preventing an excessive pressure in the tanks 19, 26, by means of pressure relief valves 30, 31, of known construction, which automatically connect a by-pass or return pipe 32 with either pump, when a predetermined pressure in either tank is reached, so that the fluid discharged by either pump is returned to the sump tank.

It will thus be seen that the action of the fluid under pressure upon the spindle to move it axially, is controlled by a single device, to wit—the three-way valve 22, for when the said valve is turned into the position shown in Fig. 1, the outlet port or passage 21 from the cylinder 14 is closed, and the fluid under pressure, which is admitted into the cylinder by opening the needle valve 20, acts on the rear face of the piston 15 and moves the spindle 4 forward at a substantially uniform rate.

By turning the valve 22 so as to connect the outlet passage 21 with the passage 23, the pressure is relieved from the rear face of the piston 14, as the fluid admitted into the cylinder can flow out therefrom to the sump tank 24 through the passage 21, valve 22, passage 23, and pipe 34 connecting the latter with the sump tank.

When the cylinder 14 is connected with the sump tank as described, the spindle 4 may be moved rapidly in the opposite direction by the fluid pressure from the high pressure tank acting on the front face of the piston 15, it being admitted into the chamber 35 of the cylinder between the piston and the bearing 6.

By turning the valve 22 so that it connects the passage 21 with the passage 25 which leads to the pressure tank 26, fluid under pressure flows from the tank 26 through the passage 25, valve 22 and passage 21 into the cylinder 14 behind the piston 15, and moves the spindle forward. The fluid contained in the tank 26 may be at a materially lower pressure than the fluid in the tank 19, which enables the machine to be employed for different kinds or classes of work, as, for instance, the high pressure fluid supplied by the tank 19 may be used when boring or like work is to be done, and the low pressure fluid supplied by the tank 26 may be used when tapping or like work is to be performed. The spindle 4 may be moved rearwardly by fluid pressure in the chamber 35 or by atmospheric pressure acting on the front end of the spindle.

The spindle 4 in the present instance is made hollow and contains within it a holder for the piece of work 40, said holder being herein shown as a collet or chuck 41, which consists of a cylinder split longitudinally to form gripping jaws 42 between which the work 40 is inserted, said jaws having beveled or inclined outer surfaces 43 which coöperate with the cone-shaped inner wall 44 of the spindle.

Provision is made for moving the chuck by fluid pressure so as to cause the gripping jaws to firmly grasp the work 40, and to this end, the chuck 41 is connected by a rod 45 with a diaphragm 46 attached to a casing 47, which is secured to a hollow extension 48 of the spindle 4. The diaphragm 46 forms with the casing 47 a chamber 49 into which fluid pressure from the tank 19 may be admitted, through a valve fitting 50, having an inlet port 51 connected with the outlet pipe 18 from the tank 19, and having an outlet port 52 which leads to a chamber 53, into which projects the hollow extension 54 of the rod 45, said hollow extension being in open communication with the chamber 49 through one or more ports 55 in said extension. The fitting 50 is provided with a valve 56, which, when turned into the position shown in Fig. 1, connects the chamber 49 with the pressure supply tank 19, and the pressure admitted into the chamber 49 acts on the diaphragm 46 and moves the rod 45 and the chuck 41 connected with it rearwardly in the direction of arrow 57, and through the beveled surfaces 43, 44, causes the jaws 42 to firmly grip the work. When it is desired to release the work, the valve 56 is turned so as to cut off the chamber 49 from the pressure tank 19, and to connect said chamber with the sump tank 24 through a port 60 in the valve fitting 50, a pipe 61, passage 62 in the framework and pipe 34.

When the diaphragm 46 is relieved from fluid pressure as described, the chuck 41 is moved so as to release the gripping jaws 42 from the work, by a spring 64 located in the spindle 4 between a stationary washer 65 and the head of the chuck. The casing 47 is moved with the spindle, and coöperates with an adjustable stop 66 to limit the forward axial movement of the spindle.

The stop 66 is shown as a cross head movable on threaded rods 67, which are attached to the framework and support a second cross head 68, which in turn supports the valve fitting 50.

The spindle 4 coöperates with a tool holder, preferably a turret 70 (see Figs. 1 and 2), which is mounted on a shaft 710 supported by the framework, and is provided in the present instance with a plurality of sets of tools, one set comprising preferably a series of different tools. The turret 70 herein shown is provided with a set of radially extended arms 71 to which different boring tools 72 are secured, and having a second set of radially extended arms 73, which carry other tools 74 for acting on the exterior surface of the work. The turret 70 is capable of being rotated as herein shown, by a belt 76, slip friction pulley 77 and gears 78, 79 in a manner well understood, or in any other suitable manner.

The turret 70 is held from rotation by a locking or holding pin 80, carried by the framework and adapted to be forced by a spring 81 into a socket in the turret in alinement with each of the tools 72; and when each of the boring tools is properly positioned to bore the work, one of the tools 74 is also positioned to act on the exterior surface of the work.

Provision is made for releasing the turret so that it can be turned to bring the next tool of the sets 72, 74, into operative position, and this release may be accomplished by fluid pressure or by hand.

In the present instance, the locking pin 80 is connected with a lever 82 pivoted to the framework and capable of being manually moved by means of the handle 83 to withdraw the locking pin. The lever 82 is also connected by a link 183 with the stem or rod 84 of a diaphragm 85, forming the movable wall of a chamber 86, which is formed in the framework as herein shown, and is connected by a passage 87 with a valve fitting 88, which is connected by a pipe 89 with the pressure tank 19 and by a pipe 90 with the sump tank, said fitting having a valve 91, which is turned so as to connect the pipe 89 with the passage 87 when it is desired to withdraw the holding pin by fluid pressure, and which is turned so as to connect the passage 87 with the pipe 90 when it is desired to remove the fluid pressure from the diaphragm and permit the pin 80 to lock the turret to the framework.

The operation of the machine herein shown may be briefly described as follows:—

Turret 70 having been rotated to a proper position, the stock or work 40 is inserted in the chuck 41, the spindle 4 at the time being in its proper position. The valve 56 is then rotated to the position shown in the drawing, thus admitting fluid so as to force the diaphragm 46 back and firmly tighten the chuck 41. The rotation of the spindle is then started, and the turret 70 having been turned into its first position, the valve 22 is thrown into the position shown in Fig. 1. Fluid will then enter slowly through the passage 16 behind the piston 15 and will thus feed the spindle 4 slowly forward at a uniform rate. The tool 72 in line with the work and shown as a drill will force its way with immense pressure into the revolving work 40, and at the same time the tool 74 will reduce the outer diameter of the work. This action will continue until the thrust collar 95 on the casing 47 reaches the adjustable stop 66, whereupon further forward motion of the spindle will be prevented, although its revolution will continue. The two operations having been completed, the valve 22 is rotated so as to bring ports 21 and 23 into communication, when the fluid back of the piston 15 will be rapidly exhausted, and the spindle 4 will be forced quickly back by the pressure in the annular chamber 35. The locking pin 80 of the turret 70 being released by a momentary movement of the valve 91, the turret 70 will immediately begin to revolve on account of power derived from pulley 77, but this motion of revolution will be stopped as soon as the pin 80 is forced by the spring 81 into the next hole with which it registers.

The forward movement of the spindle 4 will then be brought about as before by a rotation of the valve 22. If a more rapid motion with a smaller amount of pressure behind the spindle is desired, as for tapping, for instance, the valve 22 is rotated so that ports 21 and 25 are connected.

When all the operations on the work 40 are entirely finished, the revolution of the spindle is stopped and the chuck 41 is released by the valve 56, when the work 40 may be quickly withdrawn.

The backward motion of the spindle 4 instead of being produced by fluid pressure in the annular chamber 35 may be brought about equally well by the atmospheric pressure acting upon the front end of the spindle itself. This is accomplished by utilizing the suction in the discharge passage 21 by way of the valve 22 to the passage 23, and thence by pipe 34 to the sump tank 24, which latter in this case should be located at a considerable distance below the machine, so as to utilize the negative head of the fluid in the conduit.

In the present instance, the work 40 is carried by the spindle 4 and the tools by the turret, but it is not desired to limit the invention to the particular arrangement of the work to the tool herein shown.

Claims:

1. In a machine of the character described, in combination, a spindle capable of rotary and axial motions and having a piston attached to it to rotate and move axially therewith, means for rotating said spindle and piston, and fluid pressure means for moving said spindle and piston axially at a substantially uniform rate.

2. In a machine of the character described, in combination, a hollow spindle axially movable, means for moving said spindle axially, a chuck extended into said hollow spindle and bodily movable therein, and fluid-actuated means movable with said spindle in the axial movement of the latter and connected with said chuck to effect movement of the latter within the hollow spindle in response to fluid under pressure.

3. In a machine of the character described, in combination, a hollow spindle movable axially, means for moving said spindle axially, means for revolving said spindle while it is being moved axially in one direction, a chuck in said hollow spindle, and fluid-operated means for operating said chuck, said fluid-operated means being movable with said spindle.

4. In a machine of the character described, in combination, a spindle movable axially and having a piston attached to it to rotate and move axially therewith, means for moving said spindle and piston axially, means for revolving said spindle and piston while they are moving axially in one direction, a chuck carried by said spindle to move axially therewith, and means carried by said spindle for operating said chuck.

5. In a machine of the character described, in combination, a spindle having a piston attached to it, means for revolving said spindle and piston, fluid-operated means for effecting axial movement of said spindle and piston at a substantially uniform rate while they are revolving, and a fluid-operated chuck carried by said spindle.

6. In a machine of the character described, in combination, a spindle capable of rotary and axial motions and of which a portion serves as a piston, means for applying fluid pressure directly to said spindle to feed it forward axially, means for regulating the rate at which said spindle is fed forward, and means for revolving said spindle while it is being fed forward.

7. In a machine of the character described, in combination, a spindle capable of rotary and axial movements and of which a portion serves as a rotating piston, means for applying fluid pressure directly to said rotating piston to feed the spindle axially, and means for revolving said spindle.

8. In a machine of the character described, in combination, an axially movable and rotatable combined piston and spindle, a cylinder in which said combined piston and spindle move, means for applying fluid to said combined piston and spindle at various pressures to vary the rate at which said piston and spindle are moved axially and means for revolving said piston and spindle while they are being moved axially.

9. In a machine of the character described, in combination, a stationary framework provided with a cylinder, a spindle movable in said cylinder and having a piston attached to it to move as one piece, a source of fluid supply under pressure connected with said cylinder, a valve controlling the passage of fluid through said cylinder, and means for revolving said piston and spindle while they are being moved axially.

10. In a machine of the character described, in combination, an axially movable and revoluble work-carrying spindle having a piston attached to it to move as one piece, a revoluble tool holder coöperating with said spindle, means for locking said tool holder in a fixed position, and means for actuating said locking means to release the tool holder.

11. In a machine of the character described, in combination, an axially movable and revoluble work-carrying spindle having a piston attached to it to move as one piece, a revoluble tool holder coöperating with said spindle, means for locking said tool holder in a fixed position, and fluid-actuated means for actuating said locking means to release the tool holder.

12. In a machine of the character described, in combination, a cylinder, a spindle movable in said cylinder and having a piston attached to it to move as one piece, a fluid-inlet passage communicating with said cylinder at one end thereof to admit fluid pressure into said cylinder behind said piston, a fluid outlet passage communicating with the same end of the said cylinder to exhaust the fluid from behind said piston, a valve in said fluid-inlet passage for controlling the admission of fluid pressure into the cylinder, a valve in said exhaust passage for controlling axial movement of said piston and spindle, and means for revolving said piston and spindle while they are being moved axially.

13. In a machine of the character described, in combination, a cylinder, a spindle movable in said cylinder and having a piston attached to it to move as one piece, a fluid-inlet passage communicating with said cylinder at one end thereof to admit fluid pressure into said cylinder behind said piston, a second fluid-inlet passage communicating with said cylinder near its opposite end to admit fluid pressure therein in front of said piston, a valve in the first-mentioned fluid inlet passage for controlling the admission of fluid pressure into the cylinder behind said piston, an exhaust passage for said cylinder communicating therewith to exhaust the fluid behind said piston, a separate valve in said exhaust passage for controlling axial movement of said piston and spindle, and means for revolving said piston and spindle while they are being moved axially.

14. In a machine of the character described, in combination, a cylinder, a spindle movable in said cylinder and having a piston attached to it to move as one piece, a fluid-inlet passage communicating with said cylinder at one end thereof to admit fluid pressure into said cylinder behind said piston, a fluid-outlet passage communicating with the same end of the said cylinder to exhaust the fluid from behind said piston, a valve in said exhaust passage to control the flow of fluid pressure from said inlet passage through said cylinder into said exhaust passage and thereby control axial movement of said piston and spindle, and means for revolving said piston and spindle as they are moved axially.

15. In a machine for boring and turning, in combination, a spindle having a piston firmly attached to it to rotate and move axially as one piece with said spindle, means for rotating said piston and spindle, and means for admitting fluid under pressure behind said piston so as to force it forward while they are revolving.

16. In a machine for boring and turning, in combination, a spindle having a piston firmly attached to it to rotate and move axially as one piece with said spindle, means for rotating said piston and spindle, means for applying fluid pressure against one face of the said piston so as to force it and the spindle forward while they are revolving, and other means for utilizing fluid pressure against the other face of said piston so as to force it and the spindle backward while they are revolving.

17. In a machine for boring and turning, in combination, a spindle having a piston firmly attached to it to rotate and move axially as one piece with said spindle, means for rotating said piston and spindle, means for applying graduated fluid pressure so as to force said piston and spindle forward at a controllable rate while they are revolving, and other means for utilizing fluid pressure against the piston so as to force it and the spindle backward while they are revolving.

18. In a machine of the character described, in combination, a cylinder, a spindle movable in said cylinder and having an enlarged portion forming a differential piston within said cylinder, a source of fluid under pressure connected with said cylinder on opposite sides of said differential piston to effect axial movement of said piston and spindle, means for controlling the admission of said fluid pressure into said cylinder, and means for revolving said piston and spindle while they are moving axially.

19. In a machine of the character described, in combination, a cylinder, a spindle movable in said cylinder and having an enlarged portion integral therewith and forming a differential piston within said cylinder, a source of fluid under pressure connected with said cylinder on opposite sides of said differential piston to effect axial movement of said piston and spindle, means for controlling said axial movement, a gear fast on said spindle, a wide-faced pinion with which said gear meshes and moves axially with relation thereto, and means for rotating said pinion to effect rotation of said spindle and piston while they are being moved axially.

20. In a machine of the character described, in combination, a hollow spindle capable of rotary and axial motions, a hollow casing attached to said spindle to revolve and move axially therewith, and provided with a member movable by fluid pressure admitted into said casing, and means carried by said hollow spindle and operatively connected with said movable member to be actuated by the latter.

In testimony whereof, I have signed my name to this specification.

HENRY E. WARREN.